3,646,020
4-ACYLOXY-3-PHENYLCARBAMYL-2H-1,2-
BENZOTHIAZINE 1,1-DIOXIDES
Harold Zinnes, Rockaway, Neil A. Lindo, Chatham, and
John Shavel, Jr., Mendham, N.J., assignors to Warner-
Lambert Pharmaceutical Company, Morris Plains,
N.J.
No Drawing. Filed July 16, 1970, Ser. No. 55,560
Int. Cl. C07d 93/02
U.S. Cl. 260—243 R          1 Claim

ABSTRACT OF THE DISCLOSURE

Substituted 4-acyloxy-3-phenylcarbamyl-2H-1,2-benzothiazine 1,1-dioxides, having the following structural formula:

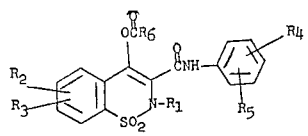

wherein $R_1$ is alkyl, aralkyl, cyanomethyl, carboalkoxymethyl, and the like. $R_2$, $R_3$, $R_4$ and $R_5$ are hydrogen, alkyl, halogen, nitro, acylamino, amino, monoalkylamino, dialkylamino, alkoxy, carboalkoxy, cyano, trifluoromethyl, methylenedioxy, and the like, and $R_6$ is alkyl, aryl, heterocyclic or alicyclic. These compounds are prepared in accordance with the following reaction scheme:

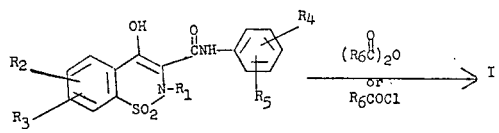

The compounds of this invention are useful as antiinflammatory and antipyretic agents.

The present invention relates to certain substituted 4-acyloxy-3-phenylcarbamyl-2H-1,2-benzothiazine 1,1-dioxides having the following structural formula:

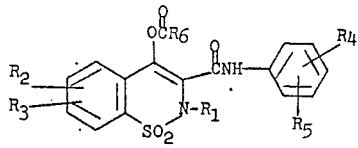

I wherein $R_1$ is alkyl, aralkyl, cyanomethyl, carboalkoxymethyl, and the like; $R_2$, $R_3$, $R_4$ and $R_5$ are hydrogen, alkyl, halogen, nitro, acylamino, amino, monoalkylamino, dialkylamino, alkoxy, carboalkoxy, cyano, trifluoromethyl, methylenedioxy, and the like; $R_6$ is alkyl, aryl, heterocyclic or alicyclic.

In the above definitions for $R_1$, $R_2$, $R_3$, $R_4$, $R_5$ and $R_6$, the term "alkyl" embraces both straight and branched chain alkyl radicals containing 1 to 8 carbon atoms, e.g., methyl, ethyl, propyl, isopropyl, n-butyl, n-amyl, n-hexyl, 2-ethyl-butyl, 2,3-dimethylbutyl, and the like. The term "halogen" includes all four halogens, i.e., fluorine, chlorine, bromine and iodine. The term "aryl" denotes a monocyclic aromatic hydrocarbon radical, preferably of 6 to 10 carbon atoms such as phenyl, tolyl, and the like.

The term "aralkyl" encompasses alkyl groups in which aryl, as defined above, is substituted for a hydrogen atom, e.g., benzyl, phenethyl, and the like, and also includes such groups in which one or more of the hydrogen atoms of the aryl portion have been substituted. The term "alkoxy" as used herein also contains from 1 to 8 carbon atoms such as methoxy, ethoxy, n-propoxy, isopropoxy, and the like.

The compounds of this invention are useful as anti-inflammatory agents and antipyretics. When administered orally or parenterally to mammals, such as rats, in doses of 10 to 250 mg./kg., they reduce the swelling of the rat paw induced by injection into the foot pads of these rats by an irritant such as carrageenin. At an oral dose of 10 to 250 gm./kg., the compounds of this invention have also been observed to inhibit yeast-induced hyperthermia in the rat. These methods for the determination of anti-inflammatory activity and antipyretic activity are well known in the art.

Accordingly, the compounds of this invention are indicated in conditions such as arthritis in a mammal such as cats, dogs, monkeys and the like. A dosage regimen of 10 to 250 mg./kg. orally or by injection several times a day is recommended. This dosage regimen can be varied in accordance with age, weight and severity of the condition being treated.

In order to use these compounds, they are formulated into dosage forms commonly used in oral or parenteral administration. These include, e.g., tablets, capsules, suspensions, solutions for injection and the like. These formulations are prepared by mixing the active ingredient with pharmaceutical excipients such as lactose, dicalcium phosphate and sterile water and compounded by methods well known to the pharmacist's art to give final forms containing 10 to 250 mg. per dosage unit.

According to the present invention, the above compounds are prepared by treating a compound having the formula structure II with the appropriate acid anhydride or acid chloride in the presence of a base such as pyridine.

The starting benzothiazines for the preparation of these compounds are described and prepared in accordance with our copending application Ser. No. 30,359 filed Apr. 20, 1970.

In order to further illustrate the practices of this invention, the following example is given:

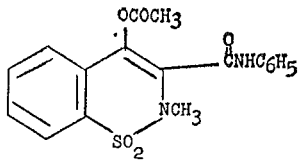

4-acetoxy-2-methyl-3 - phenylcarbamyl - 2H-1,2-benzothiazine 1,1-dioxide.—To a solution of 1.7 g. (0.005 mole) of 4-hydroxy-2-methyl-3-phenylcarbamyl-2H-1,2-benzothiazine 1,1-dioxide in 5 ml. of pyridine was added 2 ml. of acetic anhydride. The mixture was heated to boiling and then heating was continued on a steam bath for 10 minutes. It was then allowed to stand at room temperature. The resulting precipitate was washed with ether to give 1.2 g. of product, M.P. 195–196 dec. An analytical sample was obtained by recrystallization from acetonitrile; M.P. 195–196° dec.

*Analysis.*—Calcd. for $C_{18}H_{16}N_2O_5S$ (percent): C, 58.06; H, 4.33; N, 7.52; S, 8.61. Found (percent): C, 58.18; H, 4.35; N, 7.75; S, 8.86.

We claim:
1. A compound of the formula:
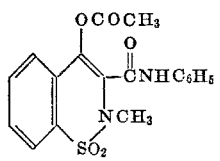
References Cited
UNITED STATES PATENTS
3,501,466   3/1970   Rasmussen _____ 260—243
JOHN M. FORD, Primary Examiner
U.S. Cl. X.R.
424—246